March 3, 1959  J. A. VICTOREEN  2,876,360
APPARATUS FOR THE COMPARISON OF SOURCES OF RADIATION
Filed Nov. 16, 1953  2 Sheets-Sheet 1
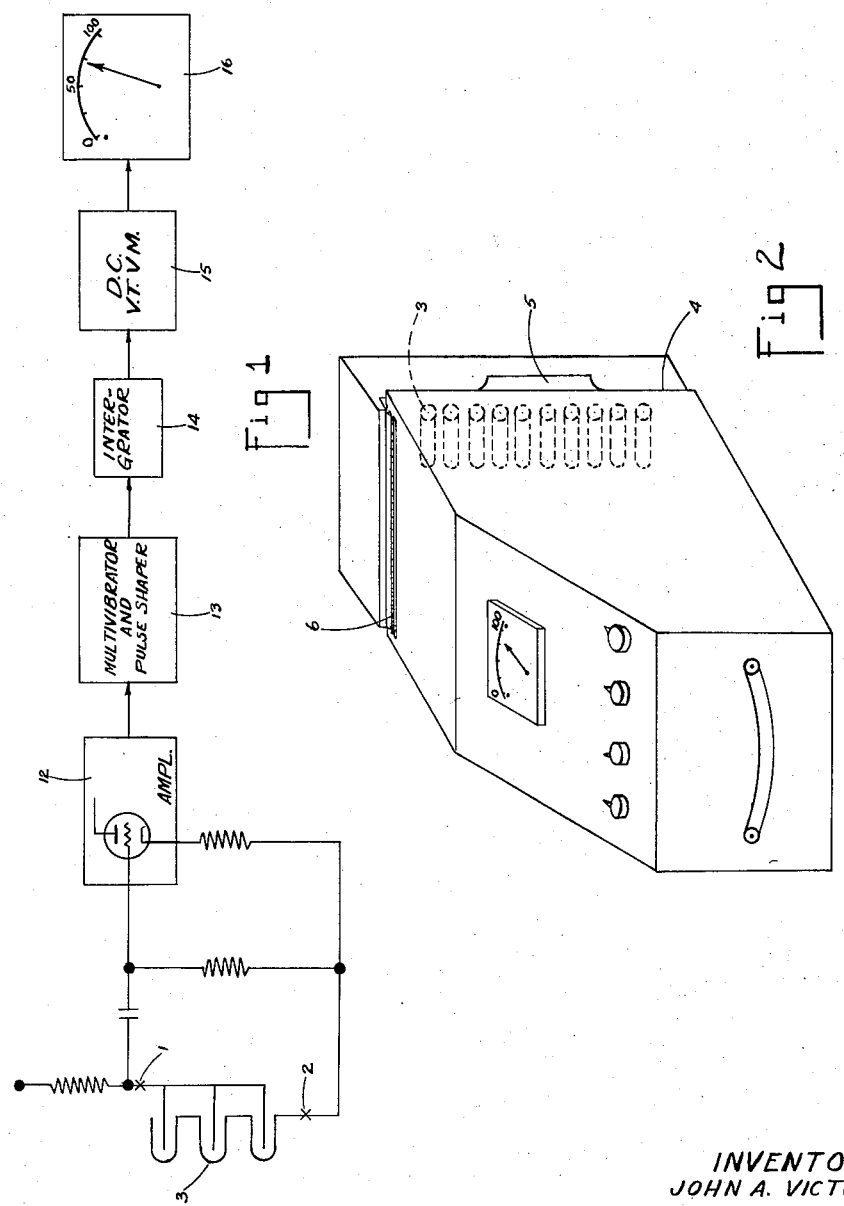
INVENTOR
JOHN A. VICTOREEN
BY J. D. Douglas
ATT'Y.

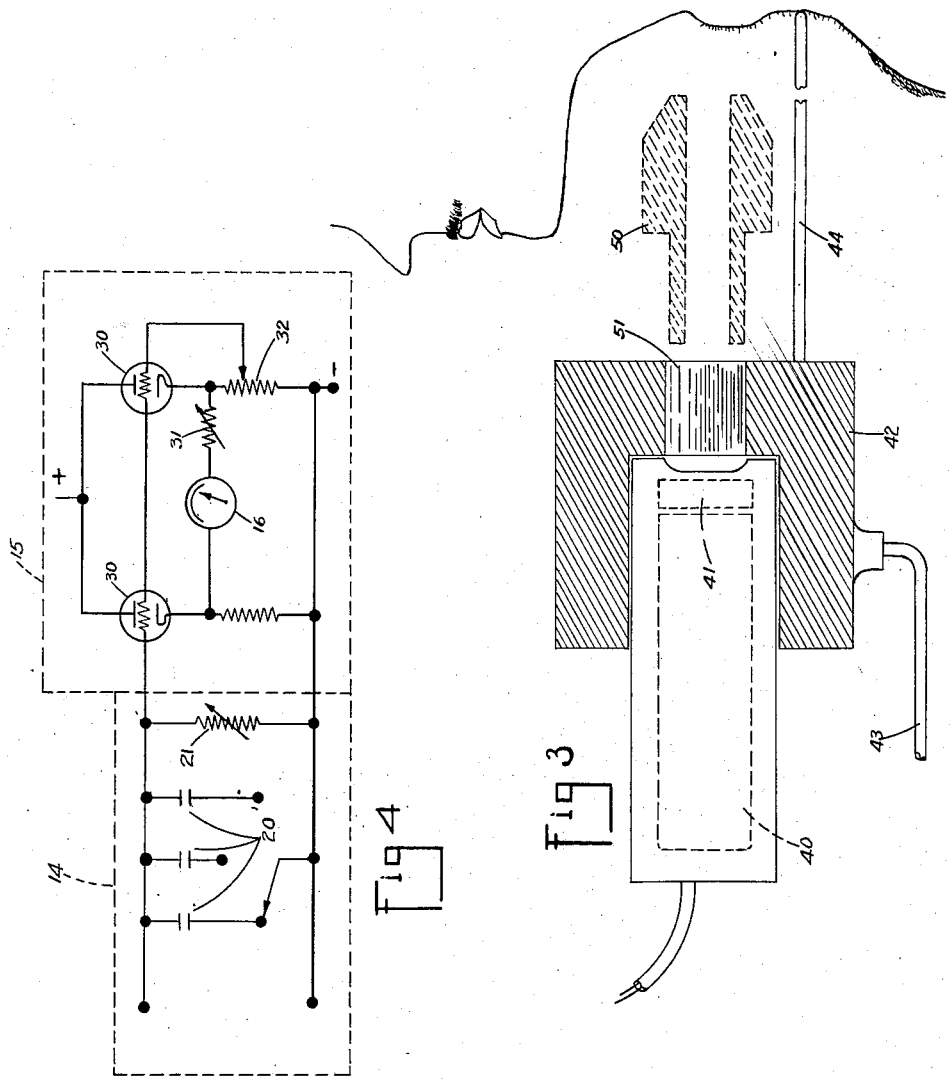

United States Patent Office 2,876,360
Patented Mar. 3, 1959

2,876,360

APPARATUS FOR THE COMPARISON OF SOURCES OF RADIATION

John A. Victoreen, Colorado Springs, Colo.

Application November 16, 1953, Serial No. 392,332

2 Claims. (Cl. 250—83.6)

This invention relates to an apparatus for measuring radiation and more particularly to an apparatus to provide comparison measurements between two or more sources of radiation to determine the relative strength thereof.

In the practice of medicine, particularly that branch which relates to the diagnosis of body functions, it is common practice to prepare a quantity of liquid containing a radio-active tracer material which liquid is administered to the patient and the progress of the radio-active material followed through the body by a suitable measuring or detecting device. One particular procedure involves the preparation of a quantity of liquid containing the tracer, which liquid after preparation is divided into equal parts one of which is administered to the patient and the other retained as a standard for subsequent comparison. Such a tracer can be comprised of any of the well known isotopes that may be safely administered. In the case of body metabolism the use of radio-active iodine is indicated because of its affinity for the thyroid gland and the fact that the halflife of the material is eight days.

In the case of measurement of the thyroid function it is desired to determine the ability of the thyroid to excrete the material in the urine in 24 hours. This is determined by measuring the radio-activity of the total urine excreted in a 24 hour period and comparing on a percentage basis with the activity of the sample retained as a standard. If desired the urine can be retained in separate containers as excreted if the time element is properly noted in connection therewith and the progress through the period thus determined.

In any event either the 24 hour sample or a sample for a shorter period is measured to determine the radio-activity and a comparison made with the original sample which thus assures that no error in measurement occurs because of a reduction in activity due to the natural radio-active decay of the product.

Heretofore a known and carefully measured absolute quantity of radio-active material was administered and afterward the absolute amount of excreted material had to be determined. The percentage excreted was then determined by taking the ratio of the two measured quantities after calculating and allowing for the amount of decay between measurements. This has heretofore required the use of an instrument which measured the quantity of radio-activity in terms of disintegration indicated per minute. Due to the relatively small amounts of radio isotopes administered a relatively long time is required to arrive at a satisfactory accuracy due to statistical fluctuations. Ordinarily the instrument used was a single Geiger tube in connection with a counting mechanism giving the results in total number of counts over a given time, or, the time required to receive a given number of counts was determined.

Under normal conditions of clinical practice a single measurement required approximately ten minutes. Ordinary practice indicates that at least three measurements be made in order to assure a good accuracy. Thus for every patient at least six ten minute readings would be required. This procedure including the calculations necessary to assure accuracy, required the services of a highly trained technician and was beyond the capabilities of the ordinary trained medical office personnel.

By the present invention results highly superior to the best results obtained by most careful and accurate measurements and calculations can be obtained and noted by persons with ordinary skill in a very short time which is only limited by the person's ability to place a bottle in front of the instrument and read a dial calibrated directly in percentages.

The technician takes the previously prepared sample, which is used as a standard of comparison and which has an identical decay condition with that of the sample administered as well as all other samples administered from the same source, and places this sample in front of the instrument and adjusts the instrument to read 100%. She then takes the specimen that has been received from this patient, dilutes it to an equal volume and places it in a container like that of the standard and can measure the radio-activity directly in percentage. With these few simple operations it can be determined exactly what percentage of material has been excreted in a certain length of time. From a medical viewpoint this enables the diagnostician to determine whether the thyroid is hypo or hyperactive. It is also possible with this apparatus to measure the percentage, directly in percentage retained by the patient in the thyroid or to determine if it is lodged in some other part of the body.

Briefly the apparatus of the invention includes a radio-active detector having an output that is proportional to the activity of the radio-active element being measured and an indicating circuit calibrated for indicating the relative quantity of a source of radiation relative to a standard.

In order to better understand the invention reference may be had to the specification which describes an embodiment thereof and which is illustrated by the accompanying drawings, wherein:

Fig. 1 is a block diagrammatic view of an apparatus embodying my invention;

Fig. 2 is a perspective view of an instrument utilizing one form of detector;

Fig. 3 is a view of another form of detector useful in the instrument of Fig. 2, and;

Fig. 4 is a schematic of the indicating circuit.

Referring now to the drawings, throughout which like parts have been designated by like reference characters, and more particularly to Fig. 1, there is indicated an input circuit which comprises a detector that is attached to the circuit at the points 1 and 2.

The detector may comprise a Geiger tube, a scintillation counter, an ionization chamber or the like. In the preferred form two devices are very useful, the one being a plurality of Geiger tubes and the other a scintillation counter each having a geometry particularly useful in the combination for its specific purpose. In the case of the Geiger tube a plurality of such tubes indicated at 3, are provided these tubes being arranged to cover a large but predetermined area. For instance as is well known such tubes may be in the form of cylinders approximately 3 inches long and ¾ inch in diameter and ten of these tubes may be arranged in a flat plaque to provide a plane of tubes horizontally disposed in a vertical line. This provides a plane which enables a bottle or like container to be moved into proximity thereto when the measurements are to be taken.

Fig. 2 illustrates how these Geiger tubes may be placed in the back of an instrument with the back wall 4 interposed between the tubes and the container, which may be placed in contact with the back wall. Guide means 5 may be provided to insure that the container is centered with relation to the Geiger tubes. If desired the back wall may include a slide 6 of aluminum or other suitable material which constitutes a beta particle shield that insures that only gamma rays will pass to the Geiger tubes. This slide can be removed to increase the sensitivity where accurate measurements are not required such as in the survey of a bench top for spilled material.

The Geiger tubes used may be of any suitable type but a preferred type would be one particularly responsive to the radiation of the material being measured which in the case of radio-active iodine would be a tube having a bismuth or other heavy metal cathode.

The tubes are connected in parallel being supplied with voltage from a power supply as indicated at 10. Having the tubes in parallel increases the sensitivity by increasing the number of pulses received per minute which results in a tenfold improvement in the statistical fluctuation of the indication as observed by the meter pointer.

Preferably the detector is connected to the input circuit of an amplifier 12 where the detector output is amplified and then is preferably conducted through a pulse shaping circuit 13 which may comprise a univibrator of any type which provides a uniform output pulse.

From the pulse shaper, the pulses are fed to an integration circuit 14 where the charge of each of the pulses is accumulated in the condenser of sufficient size to provide a relatively constant direct current which is then applied to a vacuum tube voltmeter 15 the output of which is indicated by a meter 16. The constancy of the direct current is directly controllable by the size of the condenser, and the sensitivity of the instrument to a given source of radiation is controlled by the size of the resistor.

The univibrator and pulse shaper are conventional and may be any of the types well known to those versed in the art, it being necessary merely that it be arranged that the pulses be unidirectional in polarity and they be of equal value.

As can be seen from Fig. 4, which is a schematic of the integrator 14 and vacuum tube voltmeter circuit 15—16, the pulses are applied to the capacity 20, which is tapped and may provide a variety of different values to provide various full scale sensitivities.

Preferably the condenser may be varied in six steps. It will be appreciated that the number of steps is a matter of choice determined largely by the application of the devices to be used.

Likewise, the resistance 21, which is across the condenser and provides, together with the condenser, the time constant, may be either continuously or stepwise variable to adjust the sensitivity.

The output of the integrator may be connected to any type of vacuum tube voltmeter providing only that it be one where the position of the meter may be adjusted to read zero in the presence of normal background radiation, and that the indication of the meter may be adjusted to be 100% without disturbing any previous adjustment of the preceding parts of the instrument.

To this end the portion of the instrument may include as shown a pair of vacuum tubes 30 which are connected in balanced relation as in a conventional vacuum tube amplifier. A meter 16 is connected between the cathodes of the vacuum tube in series with a variable resistance 31, which resistance provides the means for adjusting the meter to a predetermined percentage such as 100%.

Means for setting the meter to zero includes a variable resistance 32 in either of the cathode return circuits.

In operation the quantity of radio-active iodine is prepared this sample is divided into two parts, one of which is administered to the patient and the other one stored. After a predetermined period when the urine of the patient is accumulated the instrument is first adjusted to zero by moving the control 32. When the stored or standard sample is placed in position as shown in Fig. 2, the resistance 31 varied to cause the meter to read 100%.

The standard is then removed and the urine sample is placed in position. The instrument will then read directly the percentage of radio-active material in the unknown as compared with the standard. It will thus be seen that this simple operation may be completed in a relatively short time by persons with a minimum of actual technical knowledge.

Should it be desired to make measurements on the patient similar comparisons may be made by substantially the same apparatus.

Preferably the standard is placed in a container of a shape and size to simulate the gland being observed such as the thyroid. The Geiger counter portion of the device is removed from the circuit and in place thereof a scintillating counter is used as shown in Fig. 3. This detector includes a photomultiplier tube 40 at the end of which a crystal phosphor 41 is disposed. It will be apparent that the tube 40 and the Geiger counter 3 may both use the same power supply if desired without any adjustment. Preferably a heavy radiation shield 42 is supplied on the end of the tube to provide a shield against radiation from other parts of the body and make the same directional. The probe or detector unit in this case may be supported in any conventional manner such as by an arm 43 of a wall bracket which is adjustable. An additional arm 44 may extend in front of the probe which provides means for determining the distance from the subject as well as assisting in aiming the device at the subject as well as the standard.

The procedure followed in this instance is exactly the same except that after the meter is standardized with the simulated phantom thyroid container the next reading is taken directly from the patient as shown in the drawing.

As shown in dotted lines in Fig. 3, a shielding insert 50, may be provided, insertable in the aperture 51 of the shield 42 to increase the degree of collimation, which enables the device when the rod 44 is removed to be used for detection of localized centers of increased radio-activity.

Preferably the instrument of Fig. 2 is provided with a handle so that it may be used for exploration purposes such as for the detection of spilled fluids on the bench or floor.

Having thus described my invention I am aware that numerous and extensive departures may be made therefrom without departing from the spirit or scope thereof as is defined by the appending claims.

I claim:

1. An instrument for comparing two sources of similar radiation including a radiation detector having an output in proportion to the intensity of the source comprising a plurality of counter tubes connected in parallel with their axes disposed in a flat plane, an electronic rate meter circuit having a linear response connected to said detector output and including a meter indicating 100% full scale, a variable control for said meter circuit for adjusting the meter to zero in the presence of background radiation and a second variable control connected to said meter circuit setting the meter to indicate 100% in the presence of a source of radiation without altering the zero indicator when the source of radiation is removed.

2. In combination with a radiation detection means, an amplifier connected for increasing the amplitude of pulses therefrom, means for converting said impulses to unidirectional impulses of common amplitude and integrating means connected to said conversion means for integrating said pulses, means connected to said integrating means for indicating the value thereof including a vacuum tube voltmeter circuit comprising a pair of vacuum tubes having their anodes connected in parallel and meter means connected between the cathodes of said tubes in series with a resistance for reading the potential difference between said cathodes, said resistance being variable to increase or decrease said meter indication in the presence of a signal of predetermined value, one of said tubes having its grid connected to said integrating circuit and means for adjusting the potential of the other grid to adjust the current flow therein and adjust the meter to zero in the absense of a desired signal.

References Cited in the file of this patent

UNITED STATES PATENTS

| | | |
|---|---|---|
| 2,407,564 | Martin | Sept. 10, 1946 |
| 2,451,572 | Moore | Oct. 19, 1948 |
| 2,462,270 | Lipson | Feb. 22, 1949 |
| 2,539,203 | Pohl | Jan. 23, 1951 |
| 2,573,823 | Barghausen et al. | Nov. 6, 1951 |